United States Patent
Park et al.

(10) Patent No.: US 7,319,483 B2
(45) Date of Patent: Jan. 15, 2008

(54) DIGITAL AUTOMATIC WHITE BALANCE DEVICE

(75) Inventors: Hyung Man Park, Seoul (KR); Won Tae Choi, Kyungki-do (KR); Yeon Cheol Lee, Kyungki-do (KR); Kang Ju Kim, Kyungki-do (KR); Boo Dong Kwak, Kyungki-do (KR); Sang Hyun Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 631 days.

(21) Appl. No.: 10/759,187

(22) Filed: Jan. 20, 2004

(65) Prior Publication Data

US 2005/0122408 A1    Jun. 9, 2005

(30) Foreign Application Priority Data

Dec. 3, 2003    (KR) ............... 10-2003-0087101

(51) Int. Cl.
H04N 9/73    (2006.01)
H04N 1/46    (2006.01)

(52) U.S. Cl. .................. 348/223.1; 358/516

(58) Field of Classification Search .......... 348/223.1, 348/649; 345/153, 589, 604; 358/29, 516; 382/167
See application file for complete search history.

(56) References Cited

U.S. PATENT DOCUMENTS

| 4,736,241 A | * | 4/1988 | Murakami et al. | 348/225.1 |
| 5,737,032 A | * | 4/1998 | Stenzel et al. | 348/649 |
| 6,271,827 B1 | * | 8/2001 | Matsumoto | 345/601 |
| 6,486,889 B1 | * | 11/2002 | Meyers et al. | 345/604 |
| 7,162,078 B2 | * | 1/2007 | Cheng | 382/167 |
| 7,176,935 B2 | * | 2/2007 | Higgins | 345/589 |
| 2003/0052978 A1 | * | 3/2003 | Kehtamavaz et al. | 348/223.1 |

FOREIGN PATENT DOCUMENTS

| JP | 04-000989 | 1/1992 |
| JP | 04-032393 | 2/1992 |

(Continued)

OTHER PUBLICATIONS

German Patent Office Action and Translation, no date.

*Primary Examiner*—Ngoc-Yen Vu
*Assistant Examiner*—Kent Wang
(74) *Attorney, Agent, or Firm*—Lowe Hauptman Ham & Berner

(57) ABSTRACT

A digital white balance device is simply implemented in a digital processing scheme by employing a grey world algorithm. In the device, a timing controller receives vertical and horizontal synchronization signals of an input image and produces a timing control signal. An RGB multiplier multiplies input RGB image data by RGB gains received from an RGB gain controller. A first YCbCr averaging unit converts input RGB image data to YCbCr image data, and obtains first YCbCr averages of this YCbCr image data. A second YCbCr averaging unit converts output RGB image data to YCbCr image data, and obtains second YCbCr averages of this YCbCr image data. According to the timing control signal, the RGB gain controller compares the second YCbCr averages with predetermined target YCbCr averages, respectively, and obtains RGB gains based on the first YCbCr averages, according to the compared result, and provides them to the RGB multiplier.

20 Claims, 10 Drawing Sheets

FOREIGN PATENT DOCUMENTS

| | | |
|---|---|---|
| JP | 05-168032 | 7/1993 |
| JP | 08-009414 | 1/1996 |
| JP | 09-294275 | 11/1997 |
| JP | 09-307924 | 11/1997 |
| JP | 2000-350232 | 12/2000 |
| JP | 2001-160976 | 6/2001 |
| JP | 2001-169307 | 6/2001 |
| WO | 99/63479 | 12/1999 |

* cited by examiner

DIGITAL AUTOMATIC WHITE BALANCE DEVICE

BACKGROUND OF THE INVENTION

1. Field of the Invention

The present invention relates to a digital white balance device applicable to portable image systems such as camera phones, and more particularly to a digital automatic white balance device, which is simply implemented in a digital processing scheme by employing a grey world algorithm so that real-time processing is possible without help from a separate memory or a high performance processor, and which is also operated independently of an image sensor so that image data can be processed at high speed.

2. Description of the Related Art

White balance generally refers to the ability of a camera such as a TV camera to adjust its color balance on the basis of white color when capturing an image. Light has a specific color property called a "color temperature" that is expressed in units of K (Kelvin). Even though a scene such as a landscape a viewer views is illuminated by light of any color temperature, humans automatically adjusts their color sensitivity, thus not causing a color recognition difference. However, a TV camera or a film camera is greatly affected by the color temperature since the color temperature is directly reflected in the color.

For example, when the sky is clear, the entire screen is viewed as blue since sunlight has a high color temperature. On the other hand, at about sunrise or sunset, the entire screen is viewed as red since the color temperature at that time is low. If the camera captures an image under such a condition without performing any processing on it, it causes a problem in that the entire screen is viewed as blue and then red. To overcome such a problem, before shooting, light emitted from a light source is reflected from a white paper or the like, and a projected image of the reflected light is viewed to perform RGB (Red, Green and Blue) color balance adjustment to achieve a fine white color. Since most models of household camera-integrated video tape recorders (VTRs) have an automatic white balance function, such a color balance adjustment is automatically performed in the camera.

Recently, as camera phones are increasing in demand, there is a demand for image quality as high as a digital camera. There is also a demand for an image processing IC suitable for camera phones. The white balance is one of the image processing methods for achieving a high quality image. In the case where an image is captured with a CMOS or CCD image sensor under illumination conditions of different color temperatures, the red, green and blue components of the captured image are deviated to one side since a white color is not recognized well. This causes the image color tone to be distorted. The white balance functions to compensate for the distorted color tone. Thus, the white balance device is essential in camera phones that require high image quality.

FIG. 1 is a graph showing a general two-dimensional Cb-Cr color coordinate system.

Of a number of methods to perform the automatic white balance, the simplest and easiest to implement is based on a grey world algorithm. Under the assumption that the average of color-difference components of all pixels of an image is grey, the grey world algorithm obtains pixel gains for white balance, i.e., white balance coefficients. In the RGB color coordinate system, the grey is defined as "R=G=B".

For example, if the pixel depth of an image is 8 bits, each of the color-difference components "Cb and Cr" has a value of 128 in "an RGB-to-YCbCr color coordinate transformation equation", as expressed in the following equation, recommended in the ITU-R BT.601. Accordingly, the white balance can be implemented by adjusting the gain of each pixel so as to minimize a distance "d" of the average color-difference value from a white balance point (Cb=Cr=128) as shown in FIG. 1.

$$\begin{bmatrix} Y \\ Cb \\ Cr \end{bmatrix} = \begin{bmatrix} 16 \\ 128 \\ 128 \end{bmatrix} + \frac{1}{256} \begin{bmatrix} 65.738 & 129.057 & 25.064 \\ -37.945 & -74.494 & 112.439 \\ 112.439 & -94.154 & -18.285 \end{bmatrix} \begin{bmatrix} R \\ G \\ B \end{bmatrix} \quad \text{[Equation 1]}$$

There are two main conventional methods for adjusting the pixel gain for automatic white balance. One is an analog gain adjustment method, and the other is a digital image processing method. This will now be described with reference to FIGS. 2 and 3.

FIG. 2 is a block diagram showing the configuration of a conventional analog signal processor that performs white balance in an analog fashion.

As shown in this figure, the analog image signal processor for performing the analog white balance includes an analog signal processor 22, an RGB-to-YCbCr converter 23, a Cb & Cr averaging unit 24 and an RGB gain controller 25. The analog signal processor 22 captures an image of a subject passing through a lens 21, and performs signal processing on the captured image. The RGB-to-YCbCr converter 23 converts an RGB analog signal received from the analog signal processor 22 to an YCbCr signal. The Cb & Cr averaging unit 24 obtains an average value of color-difference signals among the YCbCr signals received from the RGB-to-YCbCr converter 23. The RGB gain controller 25 obtains an RGB gain on the basis of signals from the Cb & Cr averaging unit 24, and outputs the obtained RGB gain to the analog signal processor 22.

The analog signal processor 22 includes a photocell 22A, an RGB analog gain amplifier 22B, and an A/D converter 22C. The photocell 22A captures an incident image passing through the lens 21. The RGB analog gain amplifier 22B adjusts the gain of an image signal from the photocell 22A to a gain set by the RGB gain controller 25. The A/D converter 22C outputs a signal from the RGB analog gain amplifier 22B after converting it to a digital signal.

Looking into how such a conventional image signal processor performs the white balance in an analog fashion, it can be seen that it employs a feedback system so that the amplification gain for each of the RGB channels in the sensor is controlled until the average of the color-difference components is calculated and thus the white balance is completed.

Such a conventional analog white balance method is advantageous in that a relatively accurate operation is possible because the analog gain is controlled, but has the following problems. In the case where the sensor has no port for controlling the analog gain or there is no gain control function embedded in the sensor, such a conventional method is not applicable, and the implementation thereof is also difficult if gain characteristics of the analog amplifier are not correctly known.

FIG. 3 is a block diagram showing a conventional image signal processor that performs white balance in a digital fashion.

The conventional image signal processor as shown in this figure performs digital white balance. This processor employs a different method from that of FIG. 2 to implement automatic white balance. In other words, a white balance algorithm is programmed, and a digital signal processor (DSP) or a micro controller is employed to implement the automatic white balance.

Such a conventional image signal processor for performing the white balance in a digital scheme includes an image sensor unit 32, a high-performance digital signal processor (or micro controller) 33, and a memory 34, as shown in FIG. 3. The image sensor unit 32 captures an image of a subject incident through a lens 31. The high-performance digital signal processor 33 controls the gain of an image signal from the image sensor unit 32. The memory 34 stores temporary image data and a program for real-time image processing in the digital signal processor 33.

To implement a viewfinder function of a camera, a frame rate of 30 frames/sec or more is required for an image of 300,000 pixels or more, whereas a frame rate of at least 15 frames/sec is required for an image of a million pixels or more. To realize such a high frame rate, a high-performance digital signal processor or a microcomputer capable of operating at high speed is required as shown in FIG. 3, and an additional memory may also be required as circumstances demand.

Such a conventional digital processing scheme has an advantage in that, since a digital signal processor (DSP) or a microcomputer is used, the algorithm can be implemented with a program, thereby increasing system flexibility. However, the conventional digital processing scheme has a problem in that it is not suitable for application to systems such as portable image systems including a camera phone in which smaller size and smaller power consumption is required, and the system price is also increased since it uses a high-priced general-purpose processor.

SUMMARY OF THE INVENTION

Therefore, the present invention has been made in view of the above problems, and it is an object of the present invention to provide a digital automatic white balance device, which is simply implemented in a digital processing scheme by employing a grey world algorithm so that real-time processing is possible without help from a separate memory or a high performance processor, and which is also operated independently of an image sensor so that image data can be processed at high speed.

In accordance with the present invention, the above and other objects can be accomplished by the provision of a digital automatic white balance device comprising: a timing controller for receiving a vertical synchronization signal and a horizontal synchronization signal of an input image inputted to the device, and producing a timing control signal; an RGB multiplier for multiplying input RGB image data inputted to the device by received RGB gains corresponding respectively to RGB channels; a first YCbCr averaging unit for converting input RGB image data inputted to the device to YCbCr image data, and then obtaining first YCbCr averages Y1avg, Cb1avg and Cr1avg of this YCbCr image data; a second YCbCr averaging unit for converting output RGB image data outputted from the RGB multiplier to YCbCr image data, and then obtaining second YCbCr averages Y2avg, Cb2avg and Cr2avg of this YCbCr image data; and an RGB gain controller for comparing the second YCbCr averages with predetermined target YCbCr averages, respectively, according to the timing control signal from the timing controller, and obtaining RGB gains, corresponding respectively to the channels, on the basis of the first YCbCr averages, according to the compared result, and then providing the obtained RGB gains to the RGB multiplier.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
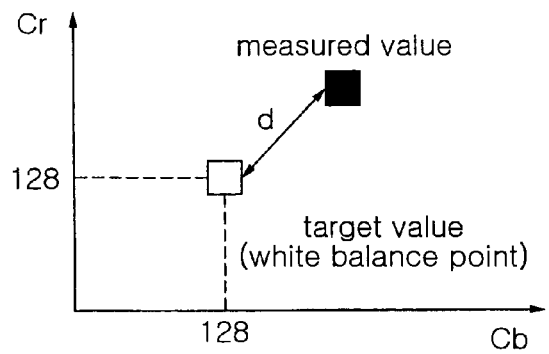
FIG. 1 is a graph showing a general two-dimensional Cb-Cr color coordinate system.
Figure 2:
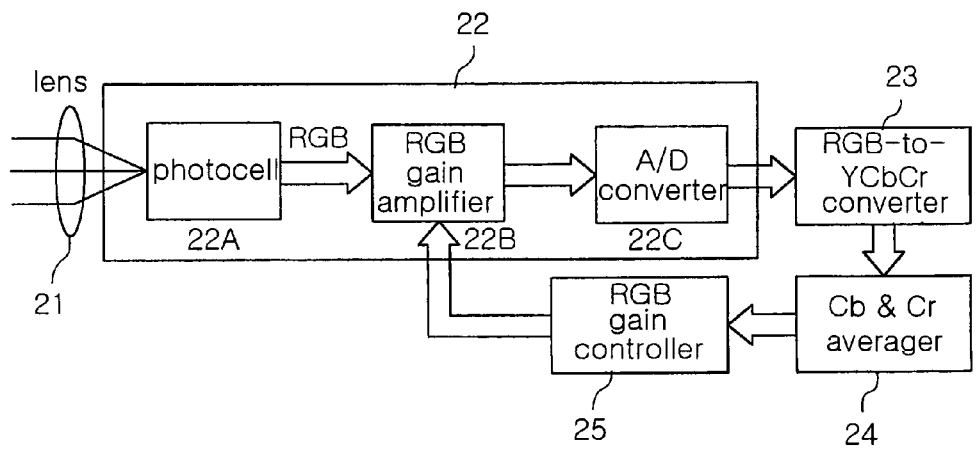
FIG. 2 is a block diagram showing the configuration of a conventional image signal processor that performs white balance in an analog fashion.
Figure 3:
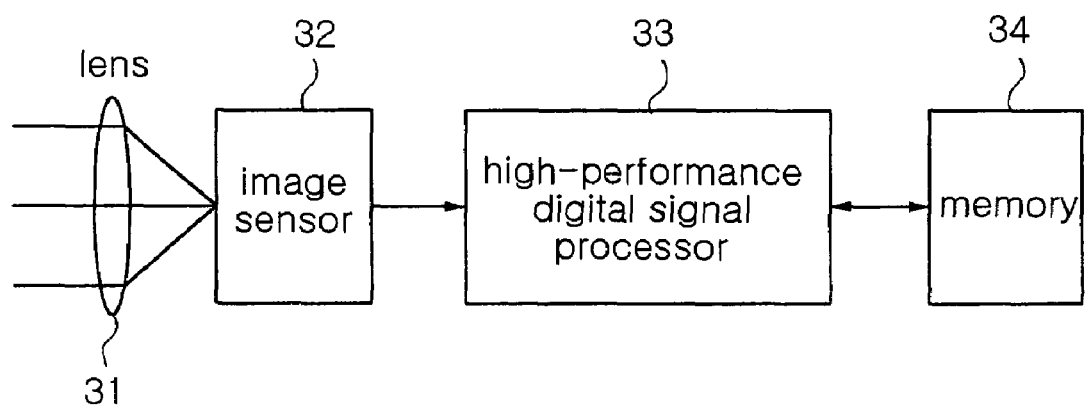
FIG. 3 is a block diagram showing a conventional image signal processor that performs white balance in a digital fashion.

Now, preferred embodiments of the present invention will be described with reference to the annexed drawings. In the drawings, the same or similar elements are denoted by the same reference numerals even though they are depicted in different drawings.

Figure 4:
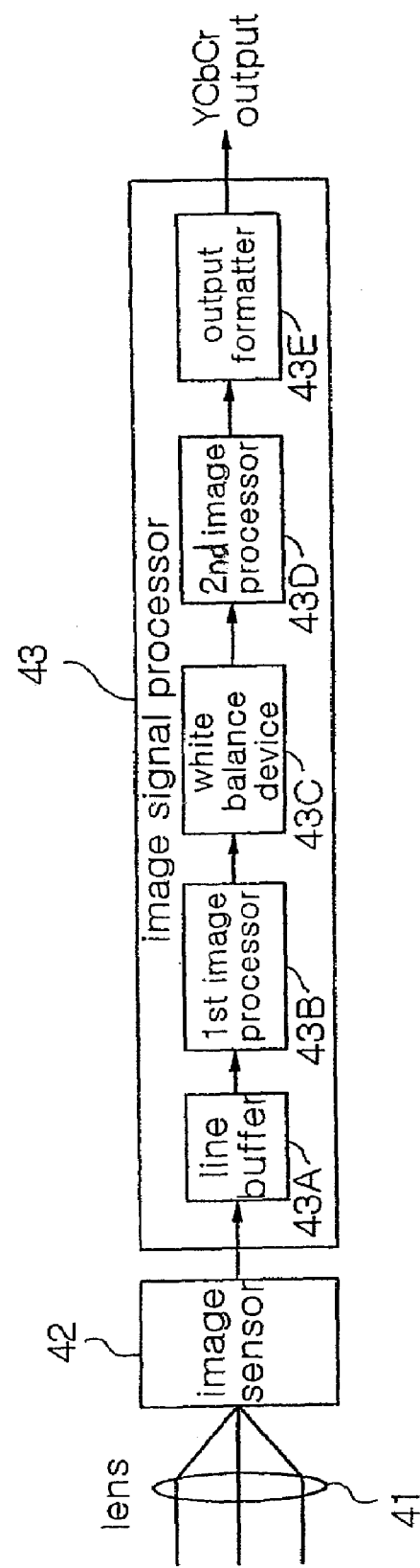
FIG. 4 is a block diagram showing the configuration of an image signal processing device to which the present invention is applied.

FIG. 4 is a block diagram showing the configuration of an image signal processing device to which the present invention is applied.

As shown in this figure, the image signal processing device to which the present invention is applied may be composed of an image sensor unit 42 and an image signal processor 43. The image sensor unit 42 captures an image of a subject incident through a lens 41. The image signal processor 43 processes image data received from the image sensor unit 42. A digital automatic white balance device according to the present invention is included in the image signal processor 43 to perform white balance for an image.

Figure 5:
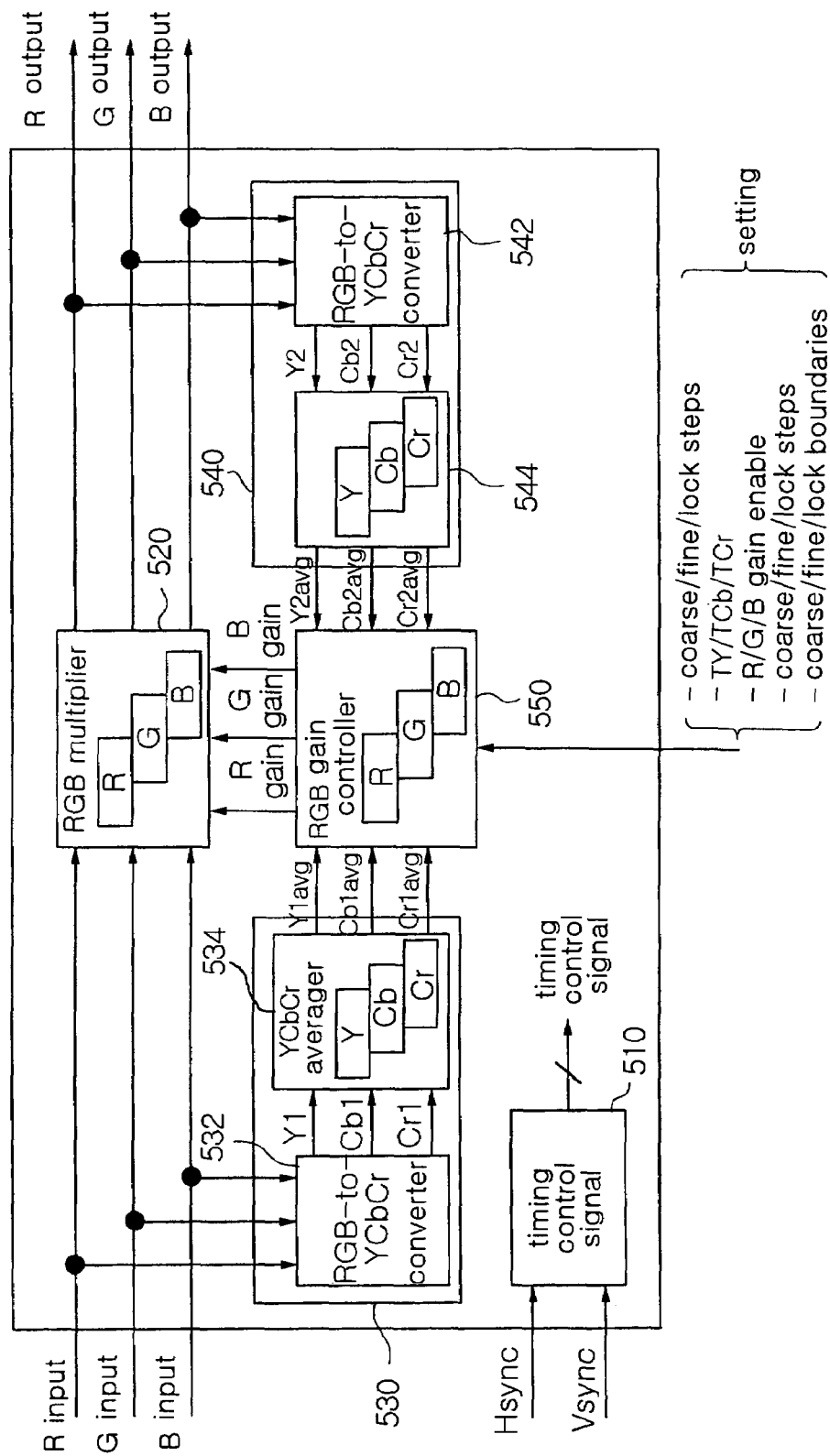
FIG. 5 is a block diagram showing the configuration of a digital automatic white balance device according to the present invention.

FIG. 5 is a block diagram showing the configuration of a digital automatic white balance device according to the present invention.

As shown in this figure, the digital automatic white balance device according to the present invention includes a timing controller 510, an RGB multiplier 520, a first YCbCr averaging unit 530, a second YCbCr averaging unit 540, and an RGB gain controller 550. The timing controller 510 receives an input vertical synchronization signal Vsync and an input horizontal synchronization signal Hsync that are inputted to the digital automatic white balance device, and produces a timing control signal. The RGB multiplier 520 multiplies input RGB image data (R input, G input and B input) respectively by RGB gains, corresponding respectively to RGB channels, received from the RGB gain controller 550, and outputs the resulting RGB image data (R output, G output and B output). The first YCbCr averaging unit 530 converts the input RGB image data to YCbCr image data, and then obtains first YCbCr averages Y1avg, Cb1avg and Cr1avg of this YCbCr image data. The second YCbCr averaging unit 540 converts the output RGB image data from the RGB multiplier 520 to YCbCr image data, and then obtains second YCbCr averages Y2avg, Cb2avg and Cr2avg of this YCbCr image data. According to the timing control signal from the timing controller 510, the RGB gain controller 550 compares the second YCbCr averages Y2avg, Cb2avg and Cr2avg with predetermined target YCbCr averages TY, TCb and TCr, respectively. According to the compared result, the RGB gain controller 550 obtains gains Rg, Gg and Bg, corresponding respectively to the RGB channels, on the basis of the first YCbCr averages Y1avg, Cb1avg and Cr1avg, and then provides the obtained gains Rg, Gg and Bg to the RGB multiplier 520.

The first YCbCr averaging unit 530 includes a first RGB-to-YCbCr converter 532 and a first YCbCr averager 534. The first RGB-to-YCbCr converter 532 converts the input RGB image data to YCbCr image data. The first YCbCr averager 534 obtains first YCbCr averages Y1avg, Cb1avg and Cr1avg of the YCbCr image data from the first RGB-to-YCbCr converter 532.

The second YCbCr averaging unit 540 includes a second RGB-to-YCbCr converter 542 and a second YCbCr averager 544. The second RGB-to-YCbCr converter 542 converts the output RGB image data to YCbCr image data. The second YCbCr averager 544 obtains second YCbCr averages Y2avg, Cb2avg and Cr2avg of the YCbCr image data from the second RGB-to-YCbCr converter 542.

The RGB gain controller 550 has preset coarse, fine and lock ranges. If the second YCbCr averages Y2avg, Cb2avg and Cr2avg are within the coarse or fine ranges, the RGB gain controller 550 recalculates RGB gains Rg, Gg and Bg corresponding respectively to the RGB channels, and provides them to the RGB multiplier 520. On the other hand, if the second YCbCr averages Y2avg, Cb2avg and Cr2avg are within the lock range, the RGB gain controller 550 provides the previous RGB gains Rg, Gg and Bg, corresponding respectively to the RGB channels, to the RGB multiplier 520.

In addition, the RGB gain controller 550 changes Y/Cb/Cr steps SY, SCb and SCr, described below, on the basis of a predetermined coarse step if the second YCbCr averages Y2avg, Cb2avg and Cr2avg are within the coarse range. In other words, the RGB gain controller 550 compares the second YCbCr averages Y2avg, Cb2avg and Cr2avg with the target YCbCr averages TY, TCb and TCr, and changes the Y/Cb/Cr steps SY, SCb and SCr by adding or subtracting the coarse step to or from the Y/Cb/Cr steps SY, SCb and SCr on the basis of the compared result. Then, the RGB gain controller 550 calculates the RGB gains Rg, Gg and Bg, corresponding respectively to the RGB channels, on the basis of the changed Y/Cb/Cr steps SY, SCb and SCr, the first YCbCr averages Y1avg, Cb1avg and Cr1avg and the target YCbCr averages TY, TCb and TCr.

On the other hand, the RGB gain controller 550 changes the Y/Cb/Cr steps SY, SCb and SCr on the basis of a predetermined fine step if the second YCbCr averages Y2avg, Cb2avg and Cr2avg are within the fine range. In other words, the RGB gain controller 550 compares the second YCbCr averages Y2avg, Cb2avg and Cr2avg with the target YCbCr averages TY, TCb and TCr, and changes the Y/Cb/Cr steps SY, SCb and SCr by adding or subtracting the fine step to or from the Y/Cb/Cr steps SY, SCb and SCr on the basis of the compared result. Then, the RGB gain controller 550 calculates the RGB gains Rg, Gg and Bg, corresponding respectively to the RGB channels, on the basis of the changed Y/Cb/Cr steps SY, SCb and SCr, the first YCbCr averages Y1avg, Cb1avg and Cr1avg and the target YCbCr averages TY, TCb and TCr.

It is preferable that, taking into account an A/D conversion resolution (pixel depth=N), the RGB gain controller 550 calculates the RGB gains Rg, Gg and Bg, corresponding respectively to the RGB channels, on the basis of a predetermined A/D conversion resolution ($2^N1$), the changed Y/Cb/Cr steps SY, SCb and SCr, the first YCbCr averages Y1avg, Cb1avg and Cr1avg and the target YCbCr averages TY, TCb and TCr.

Different operations of the RGB gain controller 550 are selected depending on whether "RGB gain enable or disable" is set according to the user's selection. In detail, if the RGB gain enable is set, the RGB gain controller 550 recalculates the RGB gains Rg, Gg, Bg and provides them to the RGB multiplier 520. On the contrary, if the RGB gain disable is set, the RGB gain controller 550 provides predetermined basic RGB gains to the RGB multiplier 520.

A detailed description will now be given of the operations and advantages of the present invention with reference to the annexed drawings.

The present invention provides a digital automatic white balance device applicable to portable image systems such as camera phones, which is simply implemented in a digital processing scheme by employing a grey world algorithm so that real-time processing is possible without help from a separate memory or a high performance processor, and which is also operated independently of an image sensor so that image data can be processed at high speed. Such a digital automatic white balance device will now be described with reference to FIGS. 4 and 9.

First, an image signal processor 43, to which the digital automatic balance device according to the present invention is applied, includes a line buffer 43A, a first image processor 43B, a white balance device 43C, a second image processor 43D and an output formatter 43E. An original image received from an image sensor unit 42 is temporarily stored in the line buffer 43A, which experiences image upgrading through the first and second image processors 43B and 43D. Automatic white balance is performed on the image at a white balance device 43C. Thereafter, the resulting image is outputted from the output formatter 43E. This output image generally has a form of YCbCr.

Figure 6:
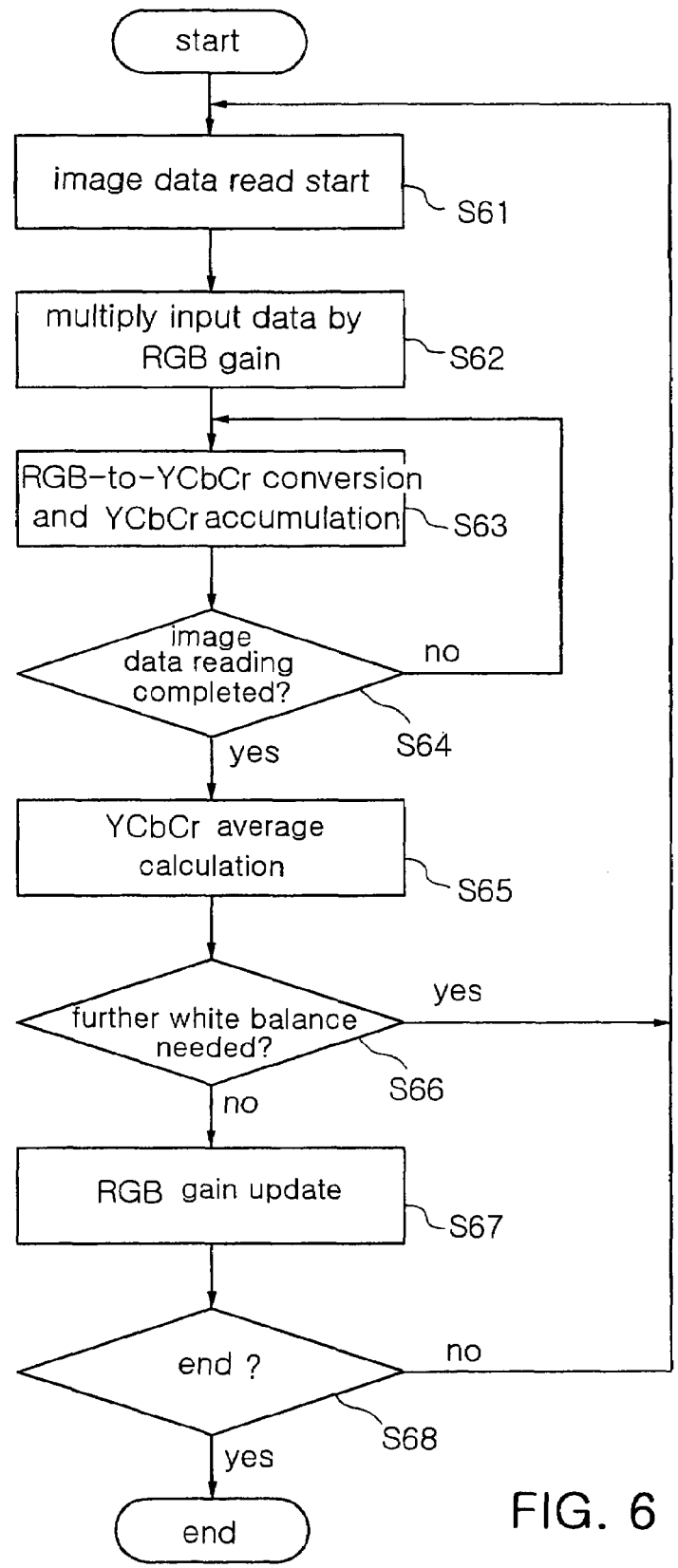
FIG. 6 is a flow chart showing the overall operating procedure of the white balance device according to the present invention.
Figure 7:
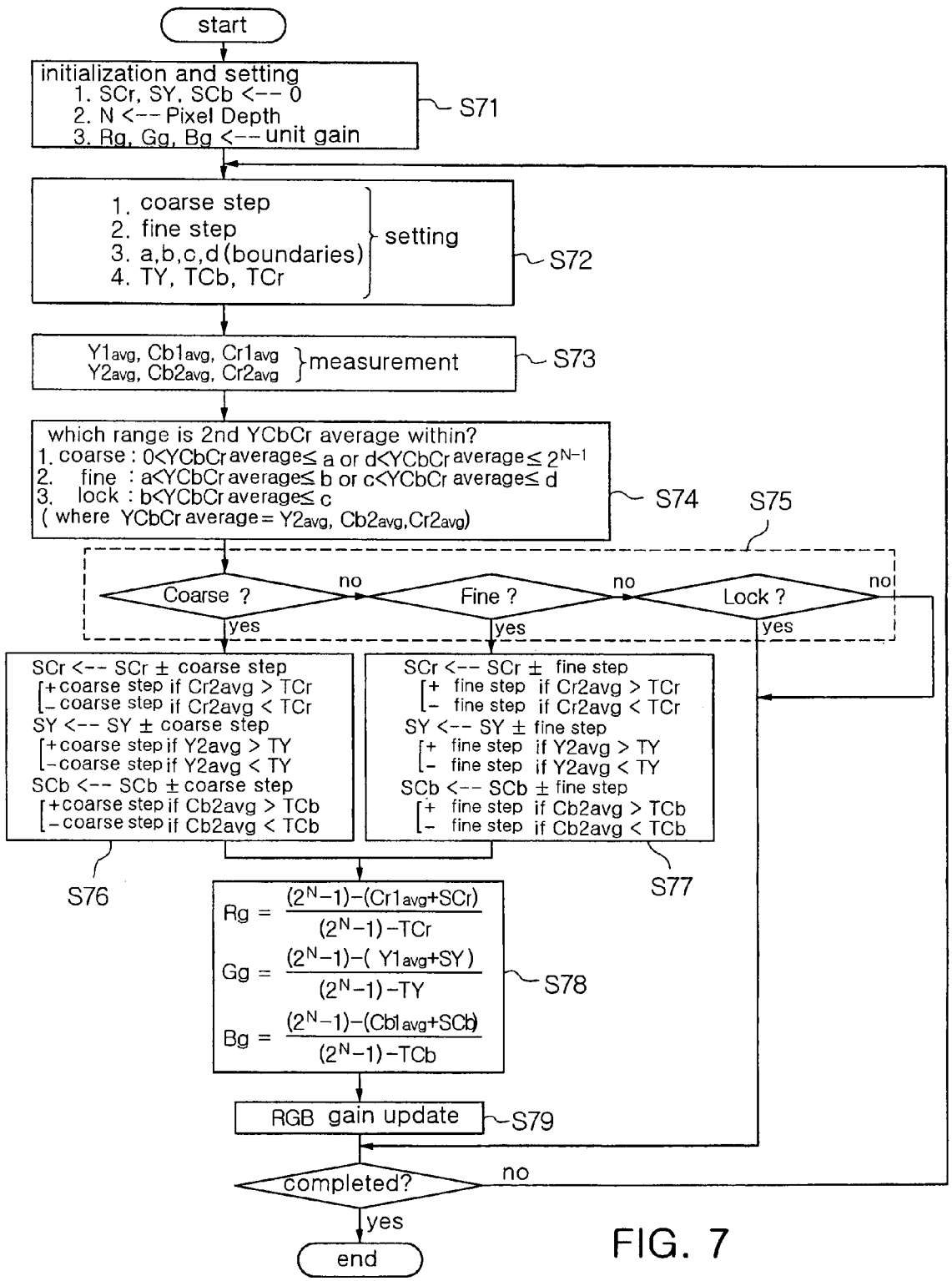
FIG. 7 is a flow chart showing a detailed operating procedure of the white balance device according to the present invention.

The first and second image processors 43B and 43D perform image processing and upgrading, which includes interpolation, color space conversion, gamma correction, noise reduction, hue/saturation, brightness/contrast, histogram equalization, or the like. In addition, in order to apply a grey world white balance algorithm to an input video image and thus perform real-time automatic white balance thereof, a sequence of processes as shown in FIGS. 6 and 7 are performed to find a target or optimal RGB gain value for white balance.

Referring to FIG. 5, the timing controller 510 in the digital white balance device according to the present invention receives a vertical synchronization signal Vsync and a horizontal synchronization signal Hsync of an input image, and produces a timing control signal to control the operating timing of each constituent element of the device.

The RGB multiplier 520 according to the present invention multiplies input RGB image data respectively by the RGB gains corresponding respectively to the RGB channels, and outputs the resulting RGB image data. The RGB multiplier 520 receives the RGB gains from the RGB gain controller 550 that will be described below.

The first YCbCr averaging unit 530 according to the present invention converts input RGB image data to YCbCr image data, and obtains first YCbCr averages Y1avg, Cb1avg and Cr1avg of this YCbCr image data. In detail, the first RGB-to-YCbCr converter 532 in the first YCbCr averaging unit 530 converts the input RGB image data to YCbCr image data, and outputs it to the first YCbCr averager 534. Then, the first YCbCr averager 534 obtains first YCbCr averages Y1avg, Cb1avg and Cr1avg of the YCbCr image data received from the first RGB-to-YCbCr converter 532, and provides the obtained first YCbCr averages to the RGB gain controller 550.

In the same manner as the first YCbCr averaging unit 530 operates, the second YCbCr averaging unit 540 converts output RGB image data from the RGB multiplier 520 to YCbCr image data, and then obtains second YCbCr averages Y2avg, Cb2avg and Cr2avg of this YCbCr image data. In detail, the second RGB-to-YCbCr converter 542 in the second YCbCr averaging unit 540 converts the output RGB image data to YCbCr image data, and outputs it to the second YCbCr averager 544. Then, the second YCbCr averager 544 obtains second YCbCr averages Y2avg, Cb2avg and Cr2avg of the YCbCr image received from the second RGB-to-YCbCr converter 532, and provides the obtained second YCbCr averages to the RGB gain controller 550.

As described above, each of the first and second YCbCr averaging units 530 and 540 continuously reads and accumulates image data until all image data of one frame is read (S61~S64) as shown in FIG. 6. If all the image data of one frame has been read, each of the first and second YCbCr averaging units 530 and 540 obtains an average of all the read image data (S65).

Thereafter, according to the timing control signal from the timing controller 510, the RGB gain controller 550 compares the second YCbCr averages Y2avg, Cb2avg and Cr2avg with predetermined target YCbCr averages TY, TCb and TCr, respectively. According to the compared result, the RGB gain controller 550 obtains RGB gains Rg, Gg and Bg, corresponding respectively to the RGB channels, on the basis of the first YCbCr averages Y1avg, Cb1avg and Cr1avg, and then provides the obtained RGB gains Rg, Gg and Bg to the RGB multiplier 520. Then, the RGB multiplier 520 multiplies the input RGB image data by the RGB gains Rg, Gg and Bg received from the RGB gain controller 550, and outputs the resulting RGB image data, as described above.

Now, a detailed description will be given of the operation of the RGB gain controller 550.

As shown in FIGS. 5 to 7, Y/Cb/Cr steps SY, SCb and SCr, "N" in the A/D conversion resolution ($2^N$–1) and RGB gains Rg, Gg and Bg have been set in advance in the RGB gain controller 550 (S71). Next, a coarse step, a fine step, values "a", "b", "c" and "d" defining the boundaries of the coarse, fine and lock ranges for setting the ranges, and target YCbCr averages TY, TCb and TCr have been set (S72). When the YCbCr average values are divided into the coarse, fine and lock ranges, the boundaries of the coarse/fine/lock ranges correspond to the values "a", "b", "c" or "d".

Then, as described above, the first YCbCr averages Y1avg, Cb1avg and Cr1avg and the second YCbCr averages Y2avg, Cb2avg and Cr2avg, obtained respectively at the first YCbCr averaging unit 530 and the second YCbCr averaging unit 540, are inputted to the RGB gain controller 550 (S73).

Next, the RGB gain controller 550 determines whether the second YCbCr averages Y2avg, Cb2avg and Cr2avg are within the coarse range, whether they are within the fine range, and whether they are within the lock range (S74). If the determined result is that the second YCbCr averages Y2avg, Cb2avg and Cr2avg are within the coarse or fine range, the RGB gain controller 550 recalculates and updates the RGB gains Rg, Gg and Bg corresponding respectively to the RGB channels (S75~S79), and provides them to the RGB multiplier 520. On the other hand, if the second YCbCr averages are within the lock range, the RGB gain controller 550 provides the previous RGB gains Rg, Gg and Bg to the RGB multiplier 520.

The RGB gain controller 550 determines the Y/Cb/Cr steps SY, SCb and SCr in the following manner.

Referring to FIG. 7, the RGB gain controller 550 changes the Y/Cb/Cr steps SY, SCb and SCr on the basis of a predetermined coarse step if the second YCbCr averages Y2avg, Cb2avg and Cr2avg are within the coarse range. In other words, the RGB gain controller 550 compares the second YCbCr averages Y2avg, Cb2avg and Cr2avg with the target YCbCr averages TY, TCb and TCr, and changes the Y/Cb/Cr steps SY, SCb and SCr by adding or subtracting the coarse step to or from the Y/Cb/Cr steps SY, SCb and SCr on the basis of the compared result (S76).

On the other hand, the RGB gain controller 550 changes the Y/Cb/Cr steps SY, SCb and SCr on the basis of a predetermined fine step if the second YCbCr averages Y2avg, Cb2avg and Cr2avg are within the fine range, as shown in FIG. 7. In other words, the RGB gain controller 550 compares the second YCbCr averages Y2avg, Cb2avg and Cr2avg with the target YCbCr averages TY, TCb and TCr, and changes the Y/Cb/Cr steps SY, SCb and SCr by adding or subtracting the fine step to or from the Y/Cb/Cr steps SY, SCb and SCr on the basis of the compared result (S77).

The coarse step refers to a step size for reaching (or searching for) a target white balance value from the coarse range, whereas the fine step refers to a step size for reaching (or searching for) the target white balance value from the fine range. The target YCbCr averages TY, TCb and TCr are target white balance values corresponding to the Y, Cb and Cr channels, respectively.

After the Y/Cb/Cr steps SY, SCb and SCr have been determined, the RGB gain controller 550 calculates the RGB gains Rg, Gg and Bg corresponding respectively to the channels, as expressed in the following equation, based on a predetermined A/D conversion resolution ($2^N$–1), the changed Y/Cb/Cr steps SY, SCb and SCr, the first YCbCr averages Y1avg, Cb1avg and Cr1avg, and the target YCbCr averages TY, TCb and TCr.

$$Rg = \frac{(2^N - 1) - (Cr1avg + SCr)}{(2^N - 1) - TCr}$$ [Equation 2]

$$Gg = \frac{(2^N - 1) - (Y1avg + SY)}{(2^N - 1) - TY}$$

-continued $$Bg = \frac{(2^N - 1) - (Cb1avg + SCb)}{(2^N - 1) - TCb}$$

The RGB gain controller 550 updates the previous RGB gains with the RGB gains calculated by the equation 2, and outputs the updated RGB gains to the RGB multiplier 520.

On the other hand, according to the present invention, different operations of the RGB gain controller 550 are selected depending on whether "RGB gain enable or disable" is set. In other words, if the RGB gain enable is set, the RGB gain controller 550 recalculates the RGB gains Rg, Gg, Bg and provides them to the RGB multiplier 520. On the contrary, if the RGB gain disable is set, the RGB gain controller 550 provides predetermined basic RGB gains to the multiplier 520.

Figure 8A:
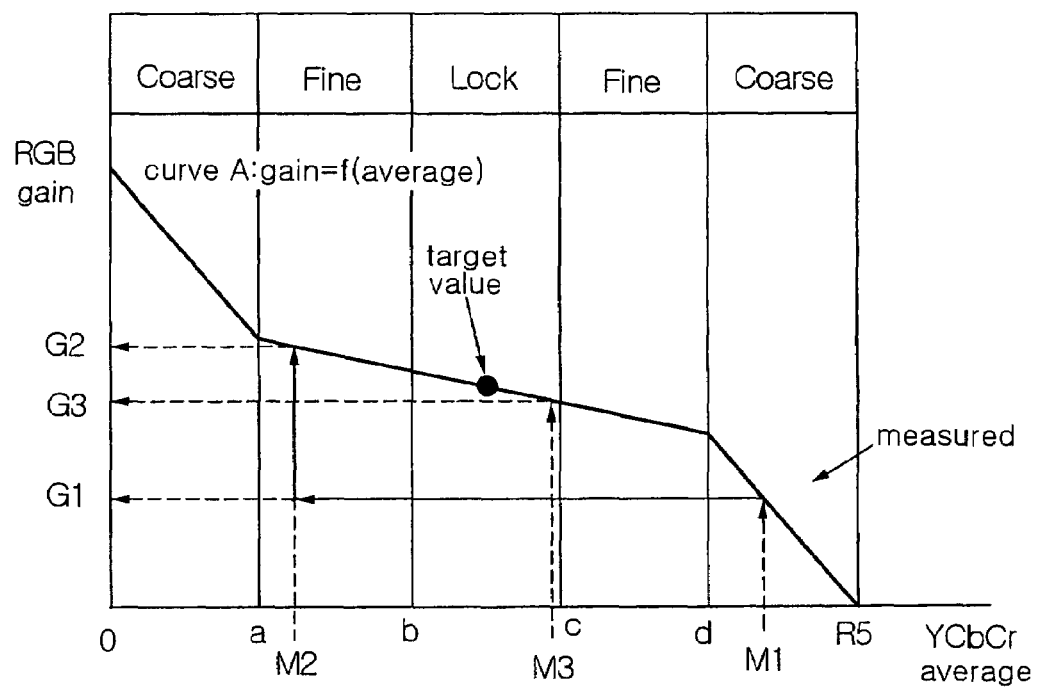
FIGS. 8a, 8b and 8c are a measured YCbCr average-RGB gain graph, an RGB gain-measured YCbCr average graph, and a white balance search graph, respectively.
Figure 8B:
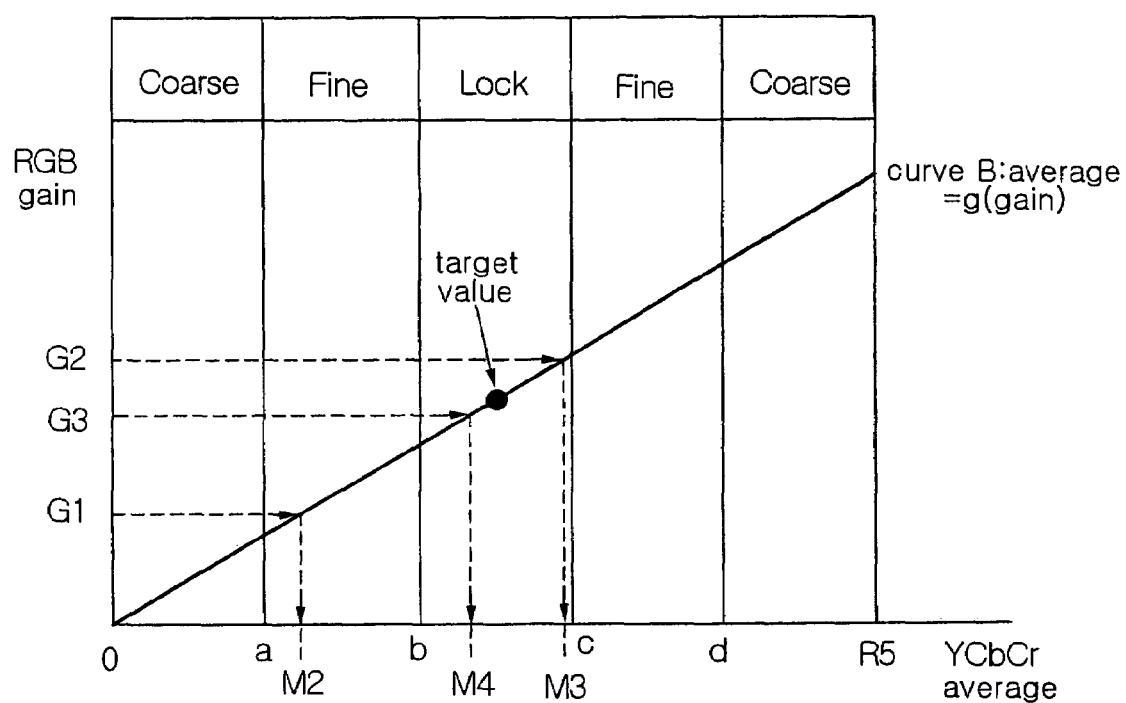
Figure 8C:
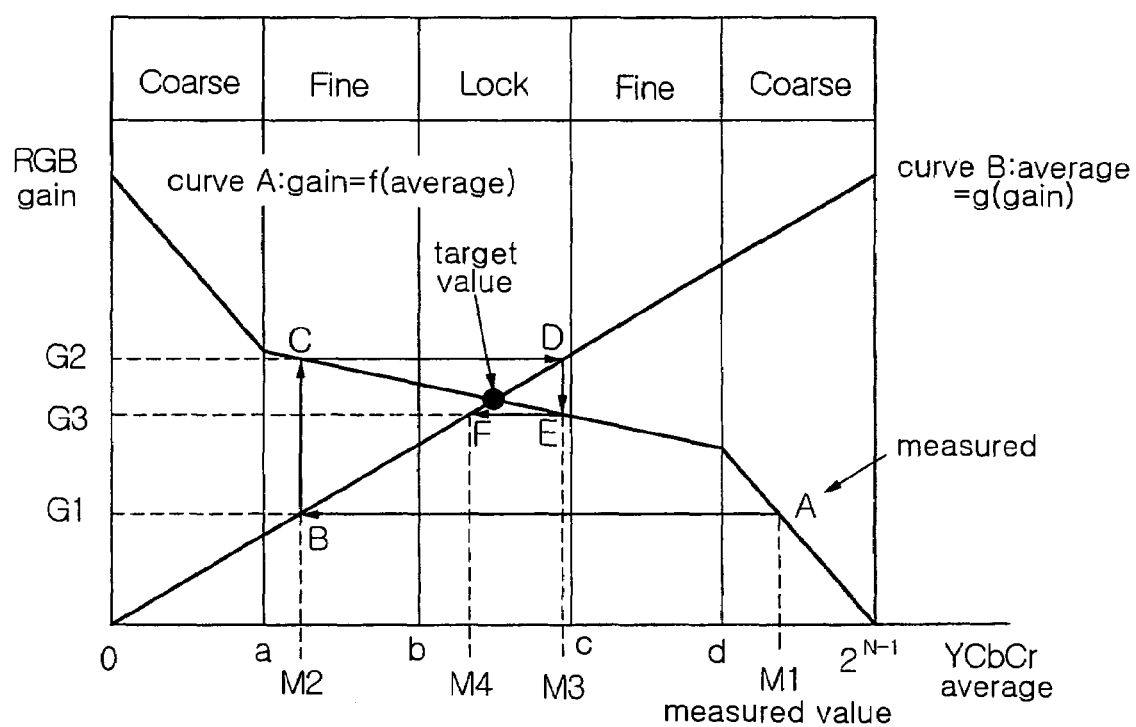

FIGS. 8a, 8b and 8c are a measured YCbCr average-RGB gain graph, an RGB gain-measured YCbCr average graph, and a white balance search graph, respectively. These graphs show curves A and B for illustrating the concept of a white balance coefficient search algorithm, proposed in the present invention, for an input image having a code level in the range from 0 to $2^N-1$ (N: pixel depth).

The measured YCbCr average values are mainly divided into five ranges (two coarse ranges, two fine ranges and one lock range), depending on how far the measured YCbCr average values are from the target value. The width of each range has an influence on both the quality of a white balanced output image and the speed for reaching the optimal white balance value.

In the coarse ranges far from the target white balance value, of the five ranges shown in FIGS. 8a to 8c, a step for reaching the target value is set larger. On the contrary, in the fine ranges nearer to the target value, a step for reaching the target value is set smaller. In the lock range nearest to the target value, the white balance search algorithm is stopped, and the RGB gains to be applied to an input image remain unchanged. The step sizes are adjustable set values used when the RGB gains are calculated. The values of the target YCbCr averages TY, TCb and TCr and the values of "a", "b", "c" and "d" for dividing the ranges as shown in FIGS. 8a to 8c are also adjustable set values. Generally, a desired white balance level is reached within 3~4 frames after the image input begins.

FIG. 8a is a measured YCbCr average-RGB gain graph, FIG. 8b is an RGB gain-measured YCbCr average graph, and FIG. 8c is a white balance search graph.

In the graph in FIG. 8a, the curve A shows the functional relationship of a YCbCr pixel average with an RGB gain (i.e., the gain=f (the average)). In other words, the function f represents RGB gains (G1~G3) to be applied to the next frame when a video image is inputted on a frame-by-frame basis, and YCbCr pixel averages (M1~M3) of the current frame are obtained.

In the graph in FIG. 8b, the curve B shows the functional relationship of an RGB gain with a YCbCr pixel average (the average=g (the gain)). The function g represents expected YCbCr averages (M2~M4) of the next frame when RGB gains (G1~G3) are applied to each pixel of the current frame.

With reference to FIGS. 8a to 8c, under the assumption that an image whose YCbCr average is M1 is inputted, the white balance search algorithm is described in more detail as follows. For example, an RGB gain corresponding to an average M1 is "G1=y (M1)" from the curve A. When the RGB gain G1 is applied to the input image, a YCbCr average "M2=g (G1)" is obtained from the curve B. The white balance level of the image, obtained in such a procedure, is near the target value but not a desired level, and thus a new RGB gain is searched for again in the same manner.

If a new RGB gain (G2=f (M2)) is applied to the curve A, a YCbCr pixel average (M3=g (G2)) is obtained from the curve B. Subsequently, if a new RGB gain (G3=f (M3)) is applied in the same manner, the image is changed to have a YCbCr pixel average (M4=g (G3)). In such a manner, the YCbCr pixel average of the image gets closer and closer to the target value.

Such a sequence of processes gradually improves the white balance level of the image as denoted by "A-B-C-D-E-F" in FIG. 8c, subsequently reaching the desired level.

Figure 9:
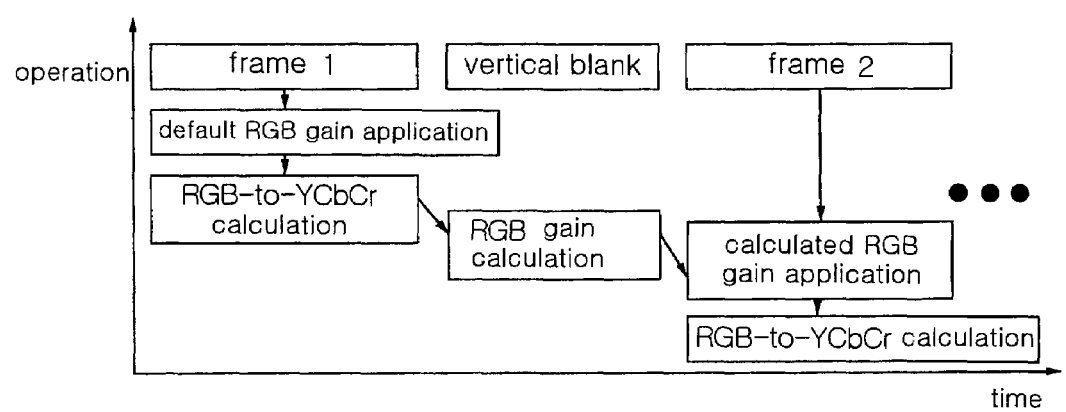
FIG. 9 is a time scheduling chart according to the present invention.

FIG. 9 is a time scheduling chart according to the present invention.

This figure shows a time scheduling for each function of the operation of the RGB gain controller. It can be seen from this figure that an RGB gain calculated for the current image is applied to the next image, and the calculation of the RGB gain is performed during a vertical blank time between images.

As apparent from the above description, a digital automatic white balance device according to the present invention has the following advantages. It is possible to implement the digital automatic white balance device at low cost without help from a separate memory or a high-performance processor. In addition, since it has a simple hardware structure, the device can be implemented in a relatively small size or area. Further, since the device employs a digital image processing scheme, it can be operated independently of an image sensor, without a separate operation for the sensor such as an analog gain control thereof. Moreover, since on-the-fly point processing is performed on image data, high speed processing can be performed on the input image, so that a real-time white balance operation can be performed without a memory when using an image preview function such as a viewfinder function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A digital automatic white balance device comprising:
   a timing controller for receiving a vertical synchronization signal and a horizontal synchronization signal of an input image inputted to the device, and producing a timing control signal;
   an RGB multiplier for multiplying input RGB image data inputted to the device by received RGB gains corresponding respectively to RGB channels;
   a first YCbCr averaging unit for converting input RGB image data inputted to the device to YCbCr image data, and then obtaining first YCbCr averages Y1avg, Cb1avg and Cr1avg of this YCbCr image data;
   a second YCbCr averaging unit for converting output RGB image data outputted from the RGB multiplier to YCbCr image data, and then obtaining second YCbCr averages Y2avg, Cb2avg and Cr2avg of this YCbCr image data; and
   an RGB gain controller for comparing the second YCbCr averages with predetermined target YCbCr averages, respectively, according to the timing control signal from the timing controller, and obtaining RGB gains, corresponding respectively to the channels, on the basis of the first YCbCr averages, according to the compared result, and then providing the obtained RGB gains to the RGB multiplier.

2. The device according to claim 1, wherein the first YCbCr averaging unit includes:
a first RGB-to-YCbCr converter for converting the input RGB image data to YCbCr image data;
and a first YCbCr averager for obtaining first YCbCr averages of the YCbCr image data from the first RGB-to-YCbCr converter.

3. The device according to claim 1, wherein the second YCbCr averaging unit includes:
a second RGB-to-YCbCr converter for converting the output RGB image data to YCbCr image data; and
a second YCbCr averager for obtaining second YCbCr averages of the YCbCr image data from the second RGB-to-YCbCr converter.

4. The device according to claim 1, wherein different operations of the RGB gain controller are selected depending on whether "RGB gain enable or disable" is set, so that if the RGB gain enable is set, the RGB gain controller recalculates and provides RGB gains, and if the RGB gain disable is set, the RGB gain controller provides predetermined basic RGB gains.

5. The device according to claim 1, wherein the RGB gain controller has preset coarse, fine and lock ranges, and if the second YCbCr averages are within the coarse or fine ranges, the RGB gain controller recalculates RGB gains corresponding respectively to the channels, and provides them to the RGB multiplier, and on the other hand, if the second YCbCr averages are within the lock range, the RGB gain controller provides previous RGB gains, corresponding respectively to the channels, to the RGB multiplier.

6. The device according to claim 5, wherein if the second YCbCr averages are within the coarse range, the RGB gain controller changes Y/Cb/Cr steps on the basis of a predetermined coarse step, and then calculates the RGB gains, corresponding respectively to the channels, on the basis of the changed Y/Cb/Cr steps, the first YCbCr averages, and the target YCbCr averages.

7. The device according to claim 6, wherein the RGB gain controller compares the second YCbCr averages with the target YCbCr averages, and changes the Y/Cb/Cr steps by adding or subtracting the coarse step to or from the Y/Cb/Cr steps on the basis of the compared result, and then calculates the RGB gains, corresponding respectively to the channels, on the basis of the changed Y/Cb/Cr steps, the first YCbCr averages, and the target YCbCr averages.

8. The device according to claim 7, wherein the RGB gain controller calculates the RGB gains on the basis of a predetermined A/D conversion resolution ($2^N-1$), the changed Y/Cb/Cr steps, the first YCbCr averages, and the target YCbCr averages.

9. The device according to claim 5, wherein if the second YCbCr averages are within the fine range, the RGB gain controller changes the Y/Cb/Cr steps on the basis of a predetermined fine step, and then calculates the RGB gains, corresponding respectively to the channels, on the basis of the changed Y/Cb/Cr steps, the first YCbCr averages, and the target YCbCr averages.

10. The device according to claim 9, wherein the RGB gain controller compares the second YCbCr averages with the target YCbCr averages, and changes the Y/Cb/Cr steps by adding or subtracting the fine step to or from the Y/Cb/Cr steps on the basis of the compared result, and then calculates the RGB gains, corresponding respectively to the channels, on the basis of the changed Y/Cb/Cr steps, the first YCbCr averages, and the target YCbCr averages.

11. The device according to claim 10, wherein the RGB gain controller calculates the RGB gains on the basis of a predetermined A/D conversion resolution ($2^N-1$), the changed Y/Cb/Cr steps, the first YCbCr averages, and the target YCbCr averages.

12. A digital automatic white balance device, comprising:
a timing controller for receiving a vertical synchronization signal and a horizontal synchronization signal of an image signal inputted to the device, and producing a timing control signal;
an RGB multiplier for multiplying input RGB image data by controllable RGB gains to obtain output RGB image data, the RGB multiplier having
image data inputs for receiving the input RGB image data,
image data outputs for outputting the output RGB image data, and
RGB gain inputs for receiving the RGB gains;
a first YCbCr averaging unit for converting the input RGB image data to input YCbCr image data, and for obtaining first YCbCr averages Y1avg, Cb1avg and Cr1avg of the input YCbCr image data, the first YCbCr averaging unit having
first inputs coupled to the image data inputs of the RGB multiplier for receiving the input RGB image data, and
first outputs for outputting the first YCbCr averages;
a second YCbCr averaging unit for converting the output RGB image data to output YCbCr image data, and for obtaining second YCbCr averages Y2avg, Cb2avg and Cr2avg of the output YCbCr image data, the second YCbCr averaging unit having
second inputs coupled to the image data outputs of the RGB multiplier for receiving the output RGB image data, and
second outputs for outputting the second YCbCr averages; and
an RGB gain controller for
comparing the second YCbCr averages with predetermined target YCbCr averages, respectively, according to the timing control signal,
controlling the RGB gains on the basis of the first YCbCr averages, according to the comparison result, and
providing the controlled RGB gains to the RGB multiplier;
wherein the RGB gain controller has
third inputs coupled to the first and second outputs of the first and second
YCbCr averaging units for receiving the first and second YCbCr averages, and
third outputs coupled to the RGB gain inputs for outputting the controlled
RGB gains to the RGB multiplier.

13. The device according to claim 12, wherein the RGB gain controller has preset coarse, fine and lock ranges, and
if the second YCbCr averages are within the coarse or fine ranges, the RGB gain controller is adapted to recalculate the RGB gains based on the first YCbCr averages, and to provide the recalculated RGB gains to the RGB multiplier, and
if the second YCbCr averages are within the lock range, the RGB gain controller is adapted to maintain current RGB gains, and to provide the current RGB gains to the RGB multiplier.

14. The device according to claim 13, wherein the RGB gain controller comprises two coarse ranges, two fine ranges located between the coarse ranges, and a single lock range located between the fine ranges.

15. The device according to claim 14, wherein the RGB gain controller is adapted to recalculate the RGB gains based on
- the first YCbCr averages,
- the target YCbCr averages, and
- predetermined coarse or fine YCbCr steps depending on whether the second YCbCr averages are within the coarse or fine ranges, respectively.

16. The device according to claim 15, wherein the RGB gain controller is adapted to
- compare the second YCbCr averages with the target YCbCr averages,
- change current YCbCr steps by adding or subtracting the predetermined coarse or fine YCbCr steps to or from the current YCbCr steps on the basis of the comparison result, and
- recalculate the RGB gains on the basis of the changed YCbCr steps, the first YCbCr averages, and the target YCbCr averages.

17. The device according to claim 16, wherein the RGB gain controller is adapted to recalculate the RGB gains on the basis of a predetermined A/D conversion resolution ($2^N-1$), the changed Y/Cb/Cr steps, the first YCbCr averages, and the target YCbCr averages.

18. The device according to claim 14, wherein the RGB gain controller is adapted to recalculate the RGB gains during a vertical blank time between consecutive image frames in the image signal.

19. The device according to claim 14, wherein the first YCbCr averaging unit is adapted to
- continuously read and accumulate the input RGB image data until all input RGB image data of each image frame in the image signal has been read, and
- obtain the first YCbCr averages as averages of all the read input RGB image data of said image frame.

20. The device according to claim 14, wherein the second YCbCr averaging unit is adapted to
- continuously read and accumulate the output RGB image data until all output RGB image data of each image frame in the image signal has been read, and
- obtain the second YCbCr averages as averages of all the read output RGB image data of said image frame.

* * * * *